Feb. 12, 1963

R. P. FRIED 3,077,053

ENVIRONMENTAL PLANTER

Filed Jan. 11, 1961

INVENTOR.
ROBERT P. FRIED

BY

Kenway, Jenney, & Hildreth

ATTORNEYS

United States Patent Office 3,077,053
Patented Feb. 12, 1963

3,077,053
ENVIRONMENTAL PLANTER
Robert P. Fried, % Modern Manufacturing Corporation, Inc., Rte. 9G, Staatsburg, N.Y.
Filed Jan. 11, 1961, Ser. No. 82,019
1 Claim. (Cl. 47—17)

This invention relates to the propagation of seeds, bulbs, plants and the like, referred to herein generally as plants. More particularly, this invention relates to a novel and improved environmental planter for the propagation of plants within the home.

It has long been known that for optimum growing conditions the soil for a plant should be above a certain temperature, the particular temperature depending upon the type of plant. Further, it is known that rapid changes in temperature of the soil are not desirable. During cold weather the maintenance of proper soil temperature presents a problem. This is true even though the plant may be located within a house, inasmuch as room temperatures are often significantly below the desired soil temperature, particularly during the sleeping hours. Also, where plants are located near a window, drafts may result in an undesirably low soil temperature.

Various means have been utilized in the past to maintain soil temperature constant or at least above a certain temperature. For example, it is a known practice to bury electrical heating units in the soil of cold frames. Another approach has been to pass high frequency current through the soil of a cold frame. Also, heating elements have been suspended above the soil, and the heat directed downward towards the soil and plants. However, most of the past approaches to the problem are not well suited for use in a home because of the size, complexity, or high cost of the components used. Furthermore, many of the heating arrangements used may cause hot spots in the immediate vicinity of the heating elements and because of poor heat distribution may result in growing conditions which are not uniform throughout the soil bed.

It is the primary object of my invention to provide a novel and improved environmental planter particularly suited for use within the home which will maintain soil temperature substantially constant at a temperature most favorable to optimum growing conditions of the plant and independent of the ambient temperature when the room temperature is below the desired soil temperature.

It is another object of this invention to provide an environmental planter of a type described in which the soil temperature within the planter may be selectively adjusted and in which the soil temperature will be substantially uniform throughout the planter.

It is a further object of my invention to provide an environmental planter of the type described which is portable, inexpensive, economical in operation, and attractive so that it will be an ornamental and desirable addition to the home.

Other objects of my invention will be in part obvious and in part apparent hereinafter.

The invention accordingly comprises the features of construction, combination of elements, and arrangement of parts which will be exemplified in the construction hereinafter set forth, and the scope of the invention will be indicated in the claim.

For a fuller understanding of the nature and objects of the invention, reference should be had to the following detailed description taken in conjunction with the accompanying drawing, in which.

Figure 1:
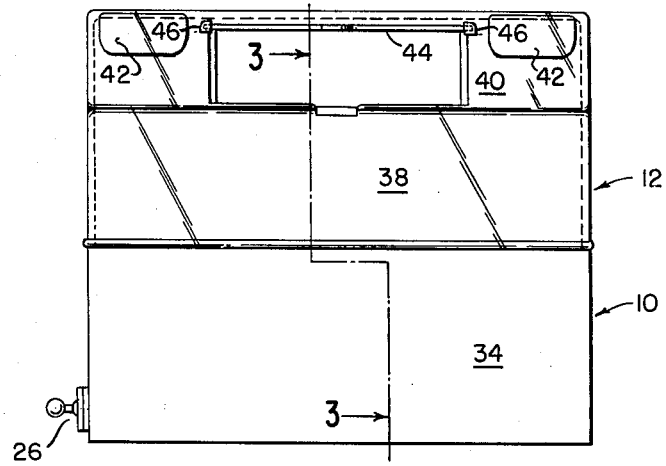
FIG. 1 is a front elevational view of an environmental planter embodying the present invention.

With reference to the drawing, a preferred embodiment of an invironmental planter constructed in accordance with this invention comprises a base 10 and a housing 12. The base 10 includes a horizontal metal base plate or soil supporting member 14 supported by and enclosed by four vertical walls 16. The base plate 14 is disposed intermediate the ends of the vertical walls 16 so that two separate compartments are provided, one above and one below the base plate 14. The upper compartment is intended to hold soil or potted plants. The lower compartment is for the location of other elements of the planter. For a reason hereinafter apparent, the base 10 should be fabricated from a material which has good thermal conducting and heat diffusing characteristics. Furthermore, the base material should be preferably one which will not corrode or rust under high humidity conditions and should be a material which will not have any toxic effect on plants or soil organisms. In the specific embodiment shown, the base 10 is cast from aluminum as a single intergral structure.

Figure 2:
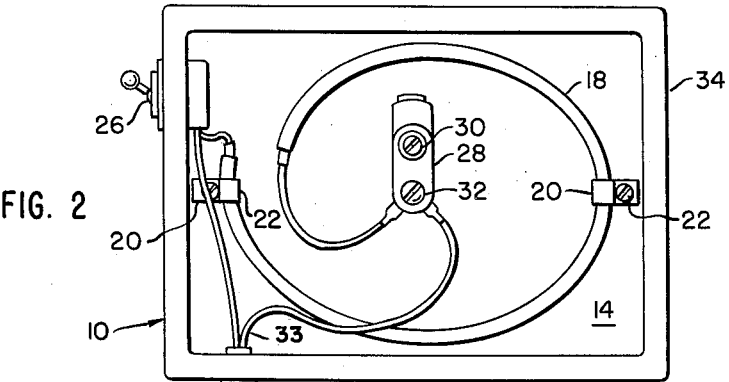
FIG. 2 is a bottom view of the planter of FIG. 1.
Figure 3:
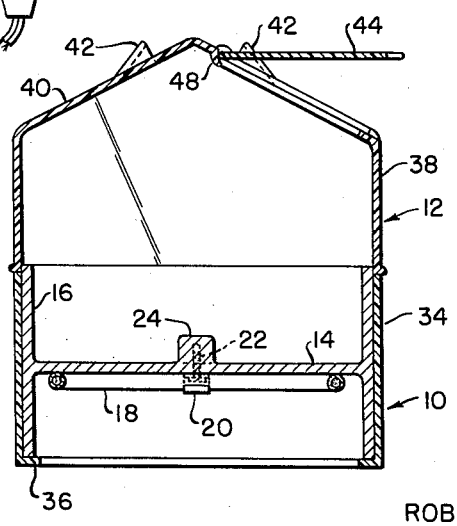
FIG. 3 is a cross-sectional view substantially along the line 3—3 of FIG. 1.

As shown in FIGS. 2 and 3, an electrical resistance is disposed within the lower compartment of the base 10 in intimate heat conducting contact with the underside of the soil supporting member 14. In the specific embodiment shown, the heating element 18 is of a type referred to as a sheathed heating element. The heating element is arranged in a generally circular configuration and is generally centered relative to the base plate 14 so that the heat from the heating element will be evenly distributed over the base plate 14. The heating element could be arranged in other geometric configurations; however, for reasons of ease and economy of manufacture, the configuration of the specific embodiment is preferred. The heating element is mounted on the base plate 14 in underlying contact therewith by clips 20 secured to the base plate 14 by screws 22. In order to minimize the weight of the planter, while still providing sufficient thickness of the base plate 14 to securely hold the heating element 18, a pair of upstanding bosses 24 are provided on the upper side of the base plate for reception of the inner ends of the screws 22.

The energizing of the heating element 18 is controlled by a toggle switch 26 and a bimetal temperature responsive switch 28 connected in series with the heating element. The toggle switch 26 is the on-off switch for the planter heating element and is mounted to one of the vertical walls 16 of the planter where it is readily accessible. While, the temperature responsive switch 28 may be of any suitable type, it is preferred to use the readily available and economical bimetal switch 28. The switch 28 is provided with the usual temperature-setting screw 30, which varies the spacing of the switch contacts to provide for selective adjustment of the temperature at which the switch contacts open and close. Thus, the temperature of the soil and/or plants within the planter may be selectively varied by a simple adjustment of the screw 30 of the switch 28. The switch 28 is secured to the underside of the base plate 14 by a screw 32 which is received in an upstanding boss (not shown) on the base plate 14 such as was described in connection with the screws 22 for the heater retaining clips 20. The switch 28 is preferably mounted with the bimetal element thereof next adjacent the underside of the base and in good heat transfer relation therewith. For then the switch 28 is preferably located so as to be sensitive to the base plate temperature generally centrally of the heating element 18. A lead 33 is connected to the heating element and switch 26 and extends through a grommet in one side wall 16 of the base for connection to a source of power.

The base 10 is further provided with a plastic jacket 34 which surrounds and encloses the vertical walls 16. The jacket is preferably dimensional so that the vertical walls 16 of the base may be slipped into and just fit within the jacket. The jacket 34 has a circumferential lip 36 at its lower end which projects inwardly from and at right angles to the vertical walls of the jacket 34. This lip 36, the supporting surface for the base, provides an insulating stand off for the metal walls 16 so that this structure will not come directly in contact with a table or other supporting structure upon which the planter rests. As clearly shown in FIG. 3, the upper end of the jacket 34 terminates short of the upper end of the vertical walls 16 so as to provide a circumferential seat for the housing 12 on the base 10. The jacket 34 may be fabricated from a suitable plastic material which gives the base an attractive outer surface and eliminates the necessity of polishing the outer surface of the vertical walls 16 of the base in order that the planter be suitable for decorative home use. The jacket 34 also tends to insulate the base and contain the heat from the heating element within the planter thus increasing the efficiency of the unit.

As shown in FIG. 3, the housing 12, when in place on the insulating base 34, forms an enclosed plant area in cooperation with the base plate 14 and the upper portion of the vertical walls 16 of the base. In my preferred embodiment, the housing 12 comprises four vertical walls 38 and a V-shaped roof 40 so that the planter has an attractive appearance simulating a greenhouse. The housing 12 is fabricated from a transparent plastic material so that the light may reach the plants within the planter and so that the planter may be used to display the plants within the planter. In order to provide circulation of air in the planter, four vents are provided in the housing, two on each side of the ridge line and at opposite ends of the roof. An access door 44 is provided in one side of the roof 40. The door 44 is secured to the roof by a pair of hinges 46 each comprising pins or pintles extending parallel to the ridge line of the roof and spaced laterally inwardly of the hinged edge of the door. The pins are received in knuckles formed integrally with the roof 40. As shown in FIG. 3, the edge of the door opening next adjacent the hinged edge of the door is provided with a lip 48 which projects angularly inwardly of the housing. As the door 44 is opened the hinged edge thereof will engage the lip 48 and deflect the same. This deflection of the lip 48 will cause a binding between the door and lip which will yieldably retain the door fully open or intermediately open when additional ventilation is desired.

My environmental planter may be used in either of two ways. Soil may be placed directly in the upper compartment of the base 10 or potted plants may be supported on the base plate 14. The heating element 18 and the temperature responsive switch 28 will maintain a substantially constant, preset temperature within the planter which is independent of the surrounding room temperature so long as the desired temperature is greater than the room temperature. In this way, the plants may be kept in a house at the proper growing temperature without having to keep the whole house or the whole room at that temperature. The housing 12 tends to retain heat and moisture in the planter to provide the desired combination of heat and humidity necessary for proper plant growth. The planter is further particularly suited for use in the home because of its attractive appearance and its economy of operation. In contrast to some of the heated cold frames and the like previously provided, the electrical heating element of the planter of this invention is not in direct contact with the soil and thus any electrical hazard which is present when a heating element is in contact with moist soil is eliminated. Furthermore, the soil bed is maintained at a substantially even temperature because of the heat diffusing characteristic of the base plate 14.

Inasmuch as many changes could be made in the above construction and many apparently widely different embodiment of this invention could be made without departing from the scope thereof, it is intended that all matter contained in the above description or shown in the accompanying drawing shall be interpreted as illustrative and not in a limiting sense.

It is also to be understood that the language in the following claim is intended to cover all of the generic and specific features of the invention herein described and all statements of the scope of the invention which, as a matter of language, might be said to fall therebetween.

I claim:

An enviromental planter for within the house use, comprising a base including a plate-like member for the support of plants disposed within the planter, an electrical resistance heating element disposed in intimate heat transfer relation with the underside of the plant supporting member, said plant supporting member having good thermal conductivity so as to provide substantially even temperature distribution throughout said plant supporting member, a temperature-responsive switch in heat transfer relation with the underside of said plant supporting member and connected to said heating element to provide control of the energizing of said heating element responsive to changes in temperature of said supporting member, a jacket member surrounding the sides of said base and a transparent housing detachably supported on said jacket member to provide a greenhouse-like enclosure for plants, said housing being provided with vents near its top to allow ventilation, said housing further being provided with a door hinged adjacent one edge, a resilient lip along the edge of the door opening next adjacent the hinged edge of the door, said hinged edge of the door being engageable with said lip during opening of the door to deflect the lip and cause a bending between the lip and door tending to maintain the door in a selectively adjusted open position.

References Cited in the file of this patent

UNITED STATES PATENTS

| | | |
|---|---|---|
| 2,019,407 | Graves | Oct. 29, 1935 |
| 2,296,860 | Martin | Sept. 29, 1942 |
| 2,703,358 | Mertler | Mar. 1, 1955 |
| 2,709,838 | Zausner | June 7, 1955 |
| 2,824,203 | Wilson | Feb. 18, 1958 |
| 2,963,819 | Hoch | Dec. 13, 1960 |